United States Patent Office 3,573,200
Patented Mar. 30, 1971

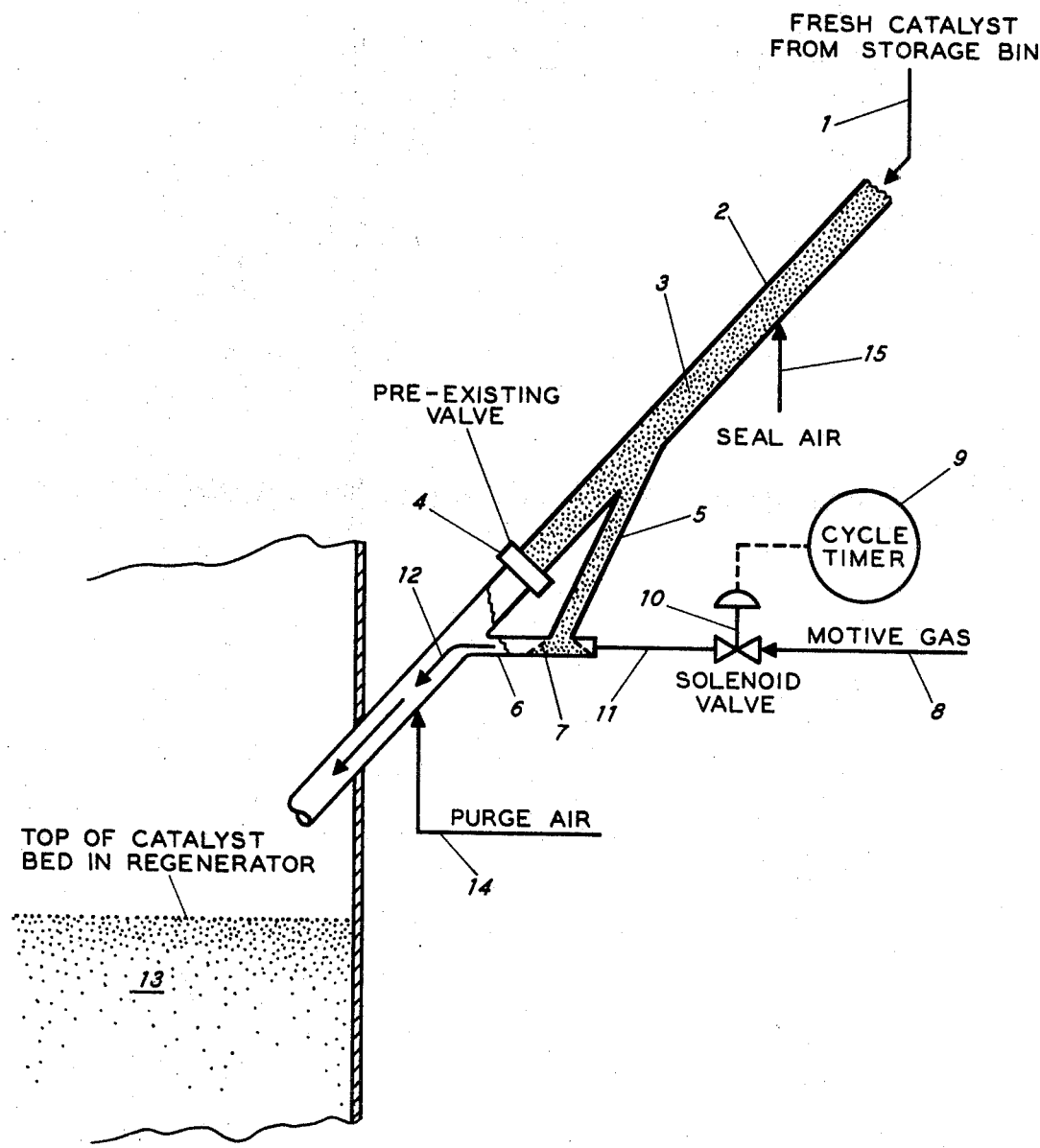

3,573,200
CATALYST MAKEUP
Raymond P. Vogel, Old Bridge, N.J., assignor to Chevron Research Company, San Francisco, Calif.
Filed Dec. 4, 1968, Ser. No. 781,121
Int. Cl. C10g 13/16
U.S. Cl. 208—173        1 Claim

ABSTRACT OF THE DISCLOSURE

Catalyst is added to a bed of catalyst in controlled amounts by an easily controlled system using, for example, motive air to move controlled amounts of catalyst through a conduit and then onto a bed of catalyst at regulated intervals. Catalyst flow is stopped when a cycle timer stops the flow of air to the conduit because the catalyst stagnates when the mass of catalyst particles introduced to the conduit (by a standpipe from fresh catalyst storage) assumes its angle of repose.

BACKGROUND OF THE INVENTION

Field of the invention

This invention relates to catalytic cracking catalyst makeup procedure.

Description of the prior art

The use of moving bodies of fluent solid particles in processes that involve the contact of masses of such solid particles with fluids, as, for example, catalytic conversions of organic vapors by solid catalysts, such as the catalytic cracking of hydrocarbons, has resulted in certain advantages due to the continuous nature of the process but has also created problems arising from the nature of the process. One such problem involving the introduction of the fluent solid particles to the regenerator and also to the contacting zone or chamber may be overcome by using methods and apparatus embodying the present invention.

This invention relates primarily to moving-bed catalyst systems. In moving-bed catalyst systems such as those of the Thermofor Catalytic Cracking (TCC) and Houdriflow processes, catalyst moves through the oil zone causing reaction and then through a regeneration zone where air continuously burns the coke deposits from the catalyst. Catalyst in the form of beads or pellets is lifted by gas (air or steam-flue gas mixture), or in older plants by bucket elevators, to a high position so that it can flow downward by gravity through the reaction and regeneration zones.

In its most preferred embodiment, the present invention is concerned with catalyst makeup in a moving-bed catalytic cracking unit. More particularly, with the addition of fresh catalyst particles to the regenerator in a moving bed catalytic cracking process, as, for example, in a Houdriflow or Houdry Catalytic Cracker (HCC). In such regenerators the catalyst is regenerated by burning off coke and residual oil that has accumulated on the catalyst while in the catalytic cracking reaction zone. The temperature at which the regeneration is conducted generally is above 900° F. and often above 1000 or 1100° F. Fresh catalyst makeup flow in an HCC unit, for example, is generally by gravity through a pipe leading from a fresh catalyst storage bin into the top of the regenerator. The flow is intermittent, usually being controlled by a motor slide valve located in the pipeline leading from the fresh catalyst storage bin into the regenerator. When it is desired to add catalyst to the system, the motor slide valve is opened and large quantities of catalyst rush through the pipe and into the regenerator vessel. Often as much as 1000 or 2000 pounds of catalyst will be added at a time by this method. Because this is such a large amount and high rate of catalyst and because the temperature of this catalyst is generally substantially below the high temperatures existing in the regenerator, localized cooling results. The localized cooling in turn results in some of the catalyst becoming substantially soaked with oil so that the catalyst burns longer than desired and is deactivated because of fusion or for other reasons.

Typically, catalyst is made up to only a very small cross sectional area of the moving-bed regenerator kiln. A cold core of catalyst is formed in the kiln. As it flows by gravity toward the lift system, regenerator temperatures in the bottom of the kiln, below the point of entry of fresh catalyst, drop substantially, while other kiln temperatures remain normal. Thus, heat transfer to the cold catalyst is poor due to (a) insufficient intermixing of hot and cold catalyst, and (b) low heat content of combustion product gases compared to catalyst heat capacity. Total time in regenerators used for Houdry Catalytic Cracking is typically about 45 to 60 minutes.

Catalyst which is relatively cool for supporting the necessary cracking reaction flows from the regenerator to the catalytic cracking reactor and contacts the hydrocarbon feed charge at the reactor inlet. In the absence of sufficient cracking the catalyst absorbs oil. The catalyst then flows to the regenerator where combustion of the oil overheats the particle, thus causing deactivation.

SUMMARY OF THE INVENTION

According to the present invention, a method is provided for adding catalyst, particularly for adding catalyst to a bed of catalyst particles, and more particularly for adding catalyst particles to a bed of catalyst particles being regenerated at high temperatures, with the addition of catalyst being automatically regulated so as to add controlled amounts of catalyst at regulated intervals and avoid upsets which cause catalyst deactivation.

Thus, according to the present invention, an automated method for adding controlled amounts of catalyst to a catalyst regeneration bed is provided. The method is comprised of the following steps:

(a) Withdrawing catalyst particles from a large mass of catalyst particles and allowing them to collect in a conduit such that flow of catalyst particles stops when the catalyst particles assume their angle of repose in said conduit;

(b) Flowing motive gas through said conduit at regular intervals, so as to move the catalyst particles in a desired direction in said conduit, thus establishing a flow of catalyst particles through said conduit;

(c) Allowing the catalyst particles to flow from said conduit into a regenerator vessel; and (d) Periodically stopping the flow of motive gas to said conduit, thus allowing the catalyst particles to again assume their angle of repose in said conduit so that the catalyst flow is stopped.

Preferably the regenerator in which the bed of catalyst being regenerated is located is part of a Houdry Catalytic Cracker.

BRIEF DESCRIPTION OF THE DRAWING

The drawing schematically indicates the method employed according to the present invention to add catalyst to the top of the catalyst bed in a regenerator.

DETAILED DESCRIPTION

Referring in more detail to the drawing, fresh catalyst from a storage bin is introduced as indicated by arrow 1 to the heart of the catalyst makeup system. The catalyst makeup system is used to maintain a constant inventory of catalyst circulating through the catalytic cracker reactor-regenerator system. Typically 2 to 2.5 tons per day must be made up through the system to replace catalyst losses for a unit having a total feed of 17,000 barrels per day of oil. In addition to quantity of catalyst makeup, both the quality and rate of catalyst makeup must be controlled to obtain the best results. It is desirable to prevent contamination of the catalyst by moisture and oil which are contained in the top zone regenerator flue gases. These contaminants result in fracture, overheating, deactivation, and increased catalyst attrition. To aid in preventing catalyst damage, the catalyst is continuously purged with seal air to prevent contamination with oil and water. The seal air enters as indicated by arrow 15 shown in the drawing. Most of the seal air flows countercurrent to the catalyst and leaves the system through the fresh catalyst storage bin. Part of the seal air passes through the catalyst flow system and into the top of the regenerator. To insure the existence of a seal the amount of seal air introduced as indicated by arrow 15 is controlled in response to pressure drop between arrow 14 and arrow 15.

Referring again to the important aspect of catalyst makeup rate, the makeup rate must be controlled to prevent cycling in the catalytic cracking unit operation conditions. Cycling results when a large quantity of cool catalyst is slugged into the hot circulating inventory.

Referring again to the drawing, fresh catalyst 3 flows through a pipe 2 toward the top of the catalyst bed in the regenerator 13. In the system used prior to the present invention, no bypass pipes 5 and 6 were provided. Instead flow to the regenerator was controlled by opening and closing valve 4. In a typical unit pipe 2 is six inches in diameter and valve 4 is a motor slide valve. As indicated previously, when the motor slide valve was open, the catalyst would come down pipe 2 in large quantities so that 1000 to 2000 pounds of catalyst would flow into the regenerator. Frequently this catalyst would be added over too short a time or it would be such a large amount of catalyst that an upset in operating conditions occurred when the catalyst was added, with resulting damage to the catalyst and decreases in catalytic conversion of feed oil to more valuable product oil.

In accordance with the present invention, a bypass pipe 5 (which may be referred to as a standpipe) is provided. Standpipe 5 is connected to conduit 6. When no motive gas is flowing into conduit 6, the catalyst assumes angle of repose 7 which causes the mass of catalyst particles to stagnate. That is, when the catalyst particles assume an angle of repose as indicated by 7, no catalyst flows through the system. The preexisting valve 4 is left closed.

It is of course to be understood that if pipe 2 with preexisting valve 4 was not already in existence, the system could be constructed differently as, for example, with pipe 5 extending directly up to the fresh catalyst storage bin and conduit 6 directly into the regenerator vessel or into an intermediate pipe connecting it to the regenerator vessel.

Also, although in the drawing conduit 6 is shown as extending from standpipe 5 approximately horizontally into main pipe 3, the conduit may be positioned at a slight angle so as to help prevent catalyst particles from rolling into pipe 3. For example, conduit 6 may be rotated in position clockwise about 10 or 15 degrees. Also, conduit 6 may be comprised, of course, of several pipe fittings. For example, a T nozzle may be connected directly onto standpipe 5, said T nozzle being at an angle of about 10 degrees clockwise rotation from horizontal, and said T connected by means of an elbow leading into another pipe which serves as the entrance pipe to main pipe 3.

To control the amount of catalyst added to the regenerator, motive gas is introduced as indicated by arrow 8. The motive gas may, for example, be air or nitrogen. Cycle timer 9 controls the opening and shutting of solenoid valve 10 which in turn controls the length of time the motive gas is allowed to flow through line 11 and into conduit 6 to cause catalyst to flow as indicated by arrow 12 into the regenerator. Line 11 is preferably about ¼-inch piping so as to provide a high velocity jet of air entering conduit 6.

The table below shows a successfully scheduled timing system used to move various amounts of fresh catalyst into an HCC unit processing 17,000 barrels per day of oil. Bypass pipes used were schedule 40, 2-inch diameter pipes; in one instance conduit 6 was comprised of a schedule 40 welding T having a cross-sectional flow area of 3.36 square inches and in the case of another unit a schedule 160 welding T having a cross-sectional flow area of 2.24 square inches.

TABLE

[2-inch, schedule 160 welding T nozzle with 2-inch, schedule 40 bypass pipe]

| Makeup rate, tons/d. | "On," minutes | "Off," minutes | Total, on and off |
|---|---|---|---|
| 0.5 | 0.5 | 39.5 | 40 |
| 1.0 | 1.0 | 39.0 | 40 |
| 1.5 | 1.5 | 38.5 | 40 |
| 2.0 | 2.0 | 38.0 | 40 |
| 3.0 | 3.0 | 37.0 | 40 |
| 4.0 | 4.0 | 36.0 | 40 |
| 5.0 | 5.0 | 35.0 | 40 |

The capacity of the automatic system is determined by the selection of the conduit 5 inside diameter and the inside diameter of the T nozzle joining conduits 5 and 6. The piping limits catalyst flow rate. The motive gas is either "on" or off" but must be in sufficient quantity to move catalyst through conduit 6. Therefore, conduit 6 preferably is only long enough to retain catalyst at angle of repose but yet having no flow. As discussed above conduit 6 may be inclined upward toward the 6-inch line at about a 10 degree angle with a horizontal line parallel to the ground.

As can be envisioned from the drawing, when the motive gas is allowed to flow through conduit 6 the catalyst is moved along so that it is disrupted from its stagnate angle or repose. When the flow of air is stopped, the catalyst flow also stops due to the mass of catalyst particles again assuming a stagnate angle of repose as indicated by 7 in conduit 6. After stopping the flow of motive gas, a small amount of catalyst will drain from the lower part of pipe 2, that is, from the part of pipe 2 located below conduit 6.

The flow of air is readily automaticaly controlled via cycle timer 9 and thus the flow of catalyst, using the system as schematically illustrated in the drawing, is automatically regulated so as to be add controlled amounts of catalyst at regular intervals and avoid any gross or large, upsetting, additions of catalysts.

The air jet velocity should be sufficiently high so that it will move catalyst faster in conduit 6 than the catalyst can flow by gravity in pipe 5. Thus, pipe 5 restricts flow. Under these conditions the flow rate of catalyst is essentially constant for a wide range of catalyst shapes (spherical and cylindrical). The system will function at lower air rate than stated above, i.e., than the air rate needed so that the size of standpipe 5 substantially determines the catalyst flow rate. However, the flow rate will then vary widely with both particle shape and air velocity leaving pipe 11. Thus, it is preferred to adjust the size of standpipe 5 and primarily the duration of air flow to conduit 6 so as to control the rate of catalyst flow.

Although various specific embodiments of the invention have been described and shown, it is to be understood that they are meant to be illustrative only and not limiting. Certain features may be changed without departing from the spirit or essence of the invention. It is apparent that this invention has broad application to the addition of catalyst particles to a catalyst bed. Accordingly, the invention is not to be construed as lim-

What is claimed is:
1. An automated method for adding controlled amounts of cracking catalyst to a cracking catalyst regeneration bed for a moving bed catalytic cracker which comprises:
(a) withdrawing cracking catalyst particles from a large mass of cracking catalyst particles and allowing them to collect in an approximately horizontal conduit such that the flow of the catalyst particles is prevented when the catalyst particles assume their angle of repose in said conduit;
(b) flowing motive gas through said conduit at regular intervals, so as to flow the cracking catalyst particles from said conduit into a regenerator vessel; and
(c) periodically stopping the flow of motive gas to said conduit so that the cracking catalyst particles again assume their angle of repose in said conduit and the cracking catalyst flow is stopped.

References Cited
UNITED STATES PATENTS

| | | | |
|---|---|---|---|
| 1,442,061 | 1/1923 | Frantz | 302—48 |
| 2,544,576 | 3/1951 | Weber | 208—173 |
| 2,609,249 | 9/1952 | Winter | 302—48 |
| 2,723,883 | 11/1955 | Lapple | 302—48 |
| 2,774,572 | 12/1956 | Goins | 208—174 |
| 3,005,772 | 10/1961 | Bergstrom et al. | 208—173 |

HERBERT LEVINE, Primary Examiner

U.S. Cl. X.R.

23—288; 302—42, 48